US011868367B2

(12) United States Patent
Azuma

(10) Patent No.: US 11,868,367 B2
(45) Date of Patent: Jan. 9, 2024

(54) INFORMATION PROCESSING APPARATUS AND INFORMATION PROCESSING METHOD

(71) Applicant: Hitachi, Ltd., Tokyo (JP)

(72) Inventor: Yuichi Azuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/114,457

(22) Filed: Feb. 27, 2023

(65) Prior Publication Data

US 2023/0376502 A1    Nov. 23, 2023

(30) Foreign Application Priority Data

May 18, 2022 (JP) ................................ 2022-081510

(51) Int. Cl.
*G06F 16/00* (2019.01)
*G06F 16/27* (2019.01)
*G06F 9/50* (2006.01)

(52) U.S. Cl.
CPC ............ *G06F 16/27* (2019.01); *G06F 9/5033* (2013.01)

(58) Field of Classification Search
CPC ................................ G06F 16/27; G06F 9/5033
See application file for complete search history.

(56) References Cited

U.S. PATENT DOCUMENTS

| 9,678,968 B1* | 6/2017 | Taylor ................. G06F 11/1435 |
| 2017/0277443 A1* | 9/2017 | Deguchi ............. G06F 11/2094 |
| 2021/0397357 A1 | 12/2021 | Azuma et al. | |

FOREIGN PATENT DOCUMENTS

| JP | 2006236019 A | * | 9/2006 | ......... G06F 11/2066 |
| JP | 2022-000719 A | | 1/2022 | |

* cited by examiner

*Primary Examiner* — Alexander Khong

(74) *Attorney, Agent, or Firm* — Mattingly & Malur, PC

(57) ABSTRACT

An information processing apparatus and method mitigate a processing delay of a system in a switched backup environment when the system is switched from a main environment to the backup environment in a hybrid cloud. A remote copy processing apparatus in the hybrid cloud has: a data access frequency management unit and a data access locality management unit that acquire and manage an access frequency and access locality regarding the access frequency from a host(s) in a public cloud to each pieces of data stored in a storage apparatus; a copy data judgment unit that judges object data of remote copy processing on the basis of a priority, the access frequency, and the access locality of the system; and a data copy execution unit that issues an instruction to the storage apparatus to start executing the remote copy processing on the object data.

13 Claims, 19 Drawing Sheets

Auto-scale and Host Correspondence Management Table

FIG. 5

Auto-scale Management Table

↙ T3

| Auto-scale ID | Default Scale-out Count | Minimum Scale-out Count | Maximum Scale-out Count | Auto-scale Host Setting Count [Environment Set Value] |
|---|---|---|---|---|
| system#1 | 30 | 5 | 60 | 30 |
| system#2 | 10 | 2 | 15 | 2 |
| system#3 | 5 | 1 | 10 | 1 |
| ... | ... | ... | ... | ... |

System Resumption Management Table

System Priority Management Table

Data Access Frequency Management Table

FIG. 9

Data Access Locality Management Table

T7

| Host ID | Data ID | The Number of Accesses |
|---|---|---|
| Host#1 | #1 | 20 |
| Host#2 | #2 | 22 |
| Host#3 | #10 | 20 |
| Host#4 | #2 | 50 |
| Host#5 | #9 | 10 |
| ... | ... | ... |

FIG. 10

Journal Volume and Meta Data Management Table

T8

| Journal Data Storage Place | Backup-side Copy Destination | Data ID |
|---|---|---|
| JNL_VOL 5000 | DATA 0000 | #1 |
| JNL_VOL 5001 | DATA 0001 | #2 |
| JNL_VOL 5002 | DATA 0002 | #3 |
| ... | ... | ... |

FIG. 11

Data Copy Time Management Table

T9

| Data ID | Copy Starting Time of Day | Copy Completion Time of Day | Data Copy Completion Flag |
|---|---|---|---|
| #1 | 2022/01/28 16:12:23 | 2022/01/28 16:13:23 | 1 |
| #2 | 2022/01/28 16:13:23 | 2022/01/28 16:13:53 | 1 |
| #3 | 2022/01/28 16:13:23 | 2022/01/28 16:14:23 | 1 |
| #4 | 2022/01/28 16:15:23 | null | 0 |
| #5 | null | null | 0 |
| ... | ... | ... | ... |

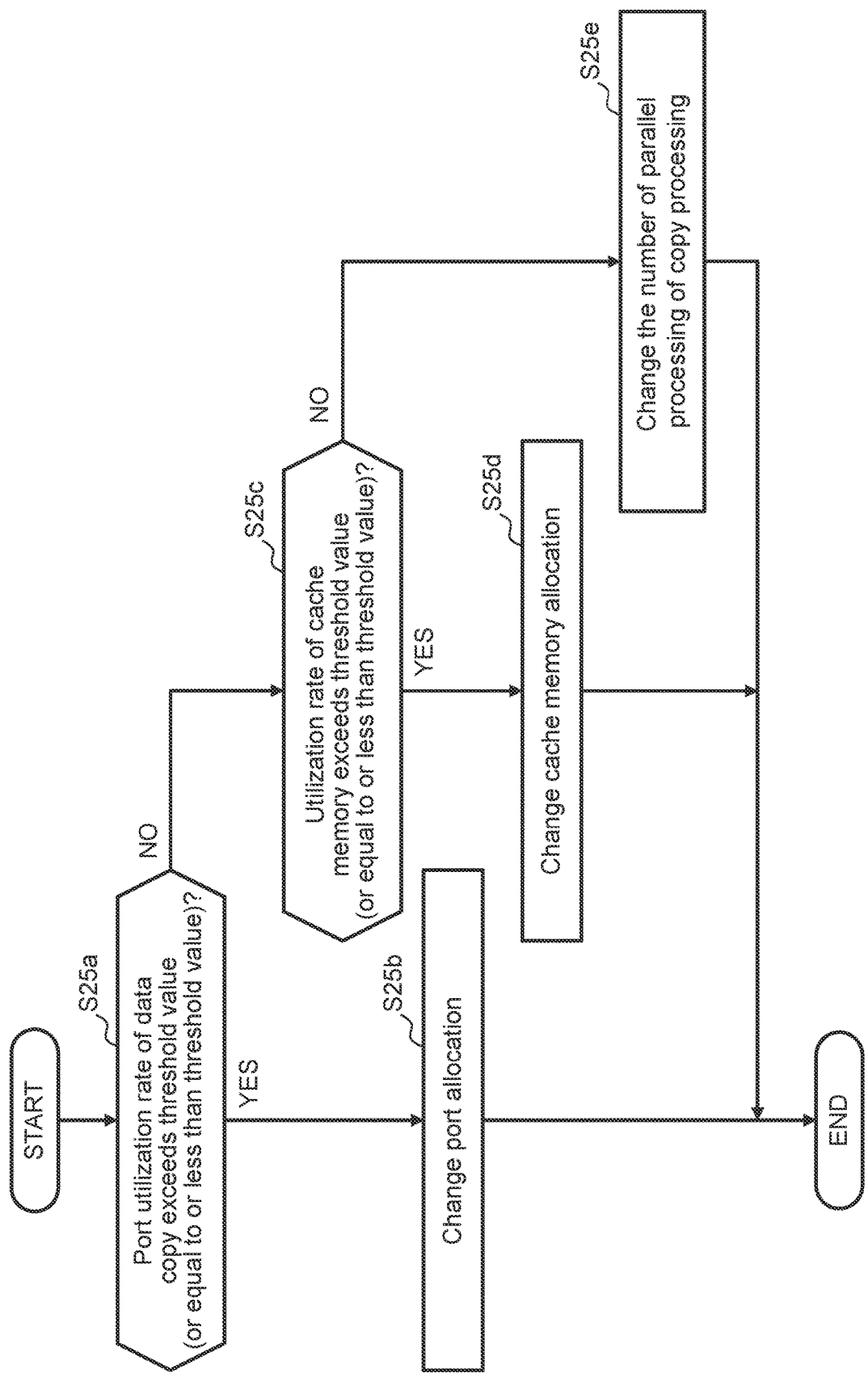

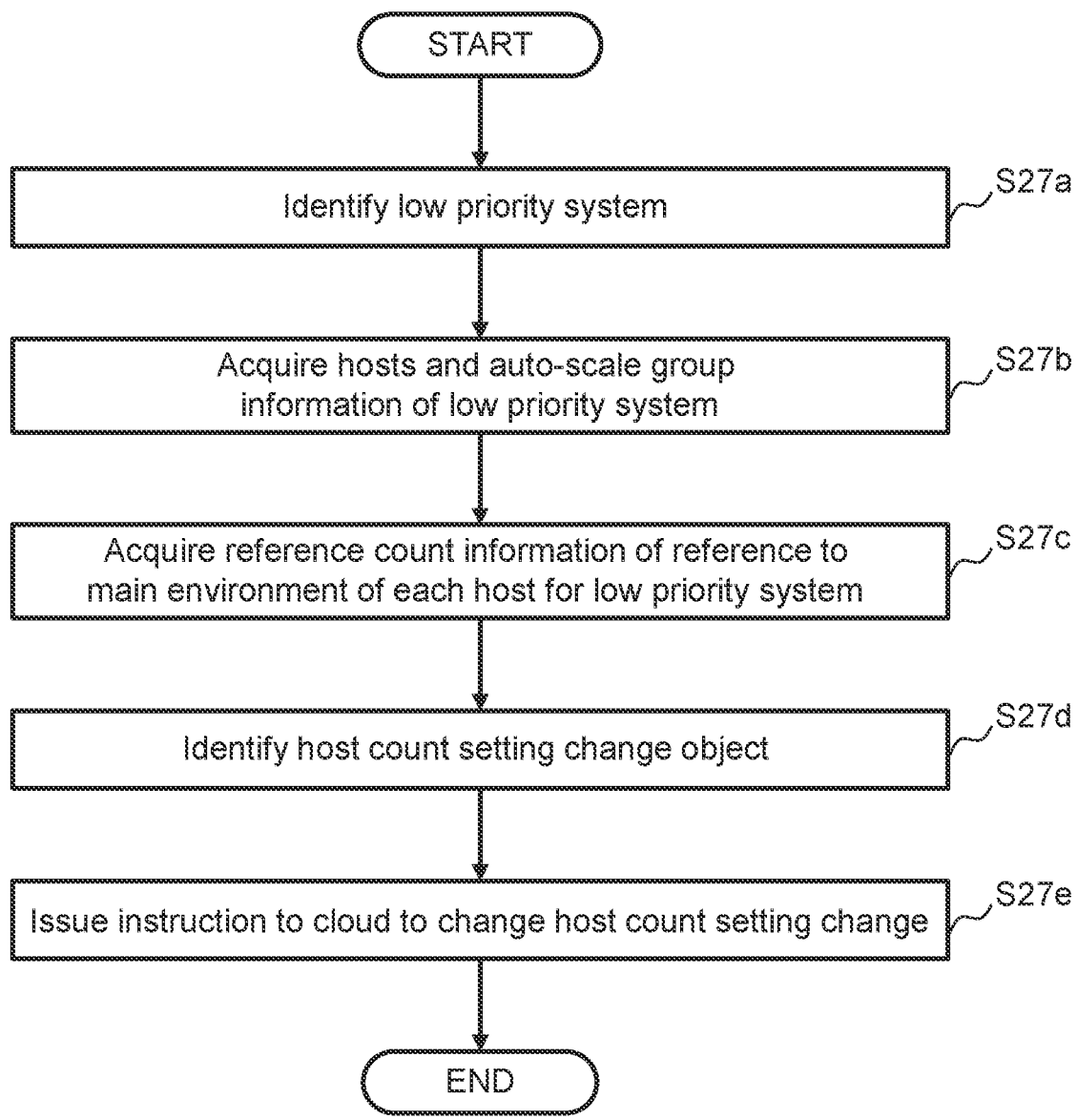

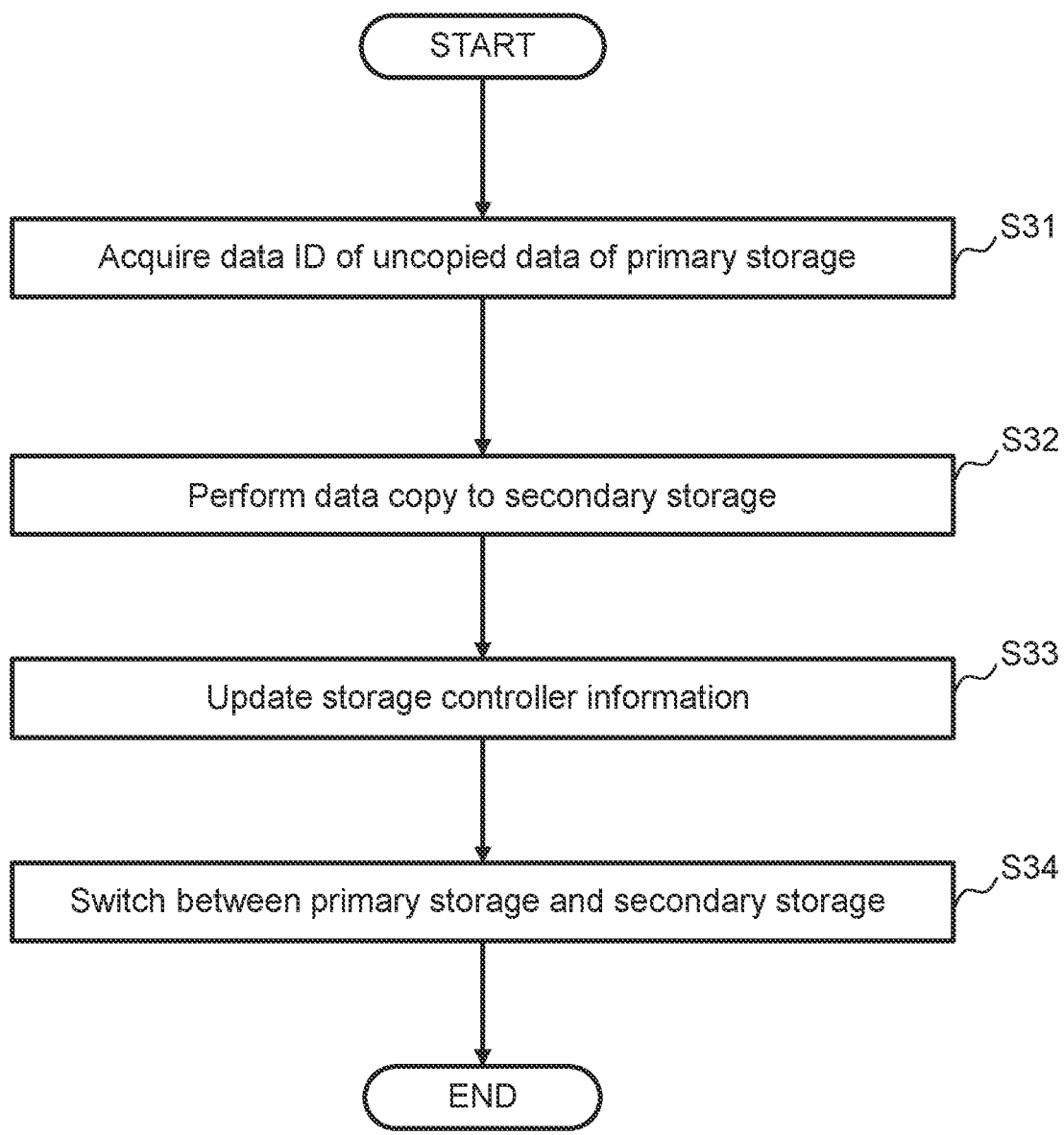

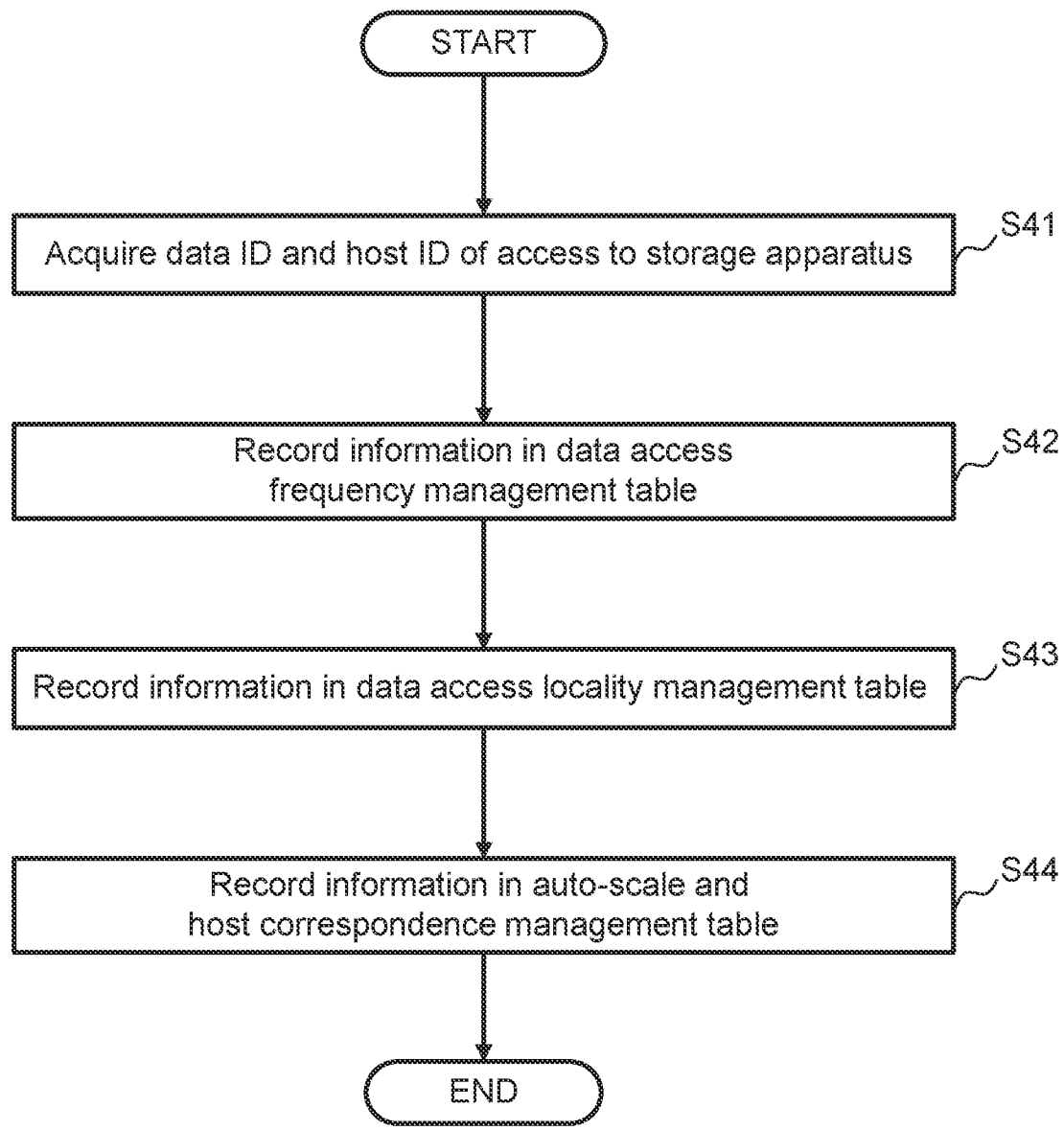

INFORMATION PROCESSING APPARATUS AND INFORMATION PROCESSING METHOD

CROSS-REFERENCE TO RELATED APPLICATION

The present application claims priority from Japanese application JP2022-081510, filed on May 18, 2022, the contents of which is hereby incorporated by reference into this application.

TECHNICAL FIELD

The present invention relates to an information processing apparatus and an information processing method.

BACKGROUND ART

In recent years, interests have been focused has on a hybrid cloud for constructing a system(s) by combining a server apparatus(es) in a public cloud and an on-premises storage apparatus(es). The hybrid cloud can maintain safety of data by using the on-premises storage apparatus(es) and suppress initial cost when introducing the system by using the server apparatus(es) in the public cloud as a host(s).

CITATION LIST

Patent Literature

PTL 1: Japanese Patent Application Laid-Open (Kokai) Publication No. 2022-000719

SUMMARY OF THE INVENTION

Problems to be Solved by the Invention

With a system configuration having a host(s) and storage in the same on-premises environment, an upper limit of processing is determined depending on specifications of a physical server, so that it is possible to prevent a speed delay due to performance insufficiency of the system by deciding an appropriate configuration when designing the performance in advance. However, with the system configuration by the hybrid cloud, an inconvenience occurs such that a static on-premises storage configuration cannot follow large-scaled and dynamic scale-out/scale-in of hosts in the public cloud, thereby causing a processing delay.

Moreover, in recent years, when systems for an active system and a standby system are located in different environments and a disaster such as an earthquake occurs, disaster recovery (DR) for making the system for the standby system take over and continue business processing from the system for the active system has become important. The DR is designed to perform processing for asynchronous remote copy of data between storage apparatuses for the active system and the standby system so that the business processing will be passed onto the standby system.

The inconvenience described above also occurs in a DR system, in which a redundant configuration between a main system (active system) environment and a subsystem (standby system) environment in the hybrid cloud is configured, when the main environment is switched to the backup environment as triggered by the stoppage of the system.

Specifically speaking, in the switched backup environment, accesses and jobs relating to the business processing during a period of time when the system stopped occur, so that load in excess of normal load occurs. Therefore, there is a possibility that the scale-out of hosts for the public cloud may be performed on a large scale and dynamically. However, as mentioned earlier, there has been the problem such that the static on-premises storage configuration cannot follow the large-scaled and dynamic scale-out/scale-in of the hosts for the public cloud and the processing delay may be caused in the system for the switched backup environment.

The present invention was devised in consideration of the above-described circumstances and aims at providing an information processing apparatus and information processing method for mitigating the processing delay of the system in the switched backup environment when the system is switched from the main environment to the backup environment in the hybrid cloud.

Means to Solve the Problems

In order to solve the above-described problem, there is provided according to one aspect of the present invention an information processing apparatus in a hybrid cloud having a cloud provided with a host or hosts where a system or systems are in operation, and a storage apparatus which is provided at other than the cloud and from and to which the host reads and writes data, the information processing apparatus for executing remote copy processing of data from a main environment hybrid cloud to the hybrid cloud, wherein the main environment hybrid cloud has a cloud provided with a main environment host where the system or systems are in operation, and a main environment storage apparatus which is provided at other than the cloud and from and to which the main environment host reads and writes data, and wherein the information processing apparatus includes: an access frequency information acquisition unit that acquires access frequency information regarding an access frequency from the host to each piece of data stored in the storage apparatus; a copy data judgment unit that judges object data of the remote copy processing on the basis of a priority of the system and the access frequency information; and a data copy execution unit that issues an instruction to the storage apparatus to start executing the remote copy processing of the object data.

Advantageous Effects of the Invention

When the system is switched from the main environment to the backup environment in the hybrid cloud, the processing delay of the system in the switched backup environment can be mitigated according to the present invention.

BRIEF DESCRIPTION OF DRAWINGS

FIG. 5 is a diagram illustrating the structure of an autoscale management table;

FIG. 9 is a diagram illustrating the structure of a data access locality management table;

FIG. 10 is a diagram illustrating the structure of a journal volume and meta data management table;

FIG. 11 is a diagram illustrating the structure of a data time management table;

FIG. 16 is a flowchart illustrating the details of storage allocation changing processing;

FIG. 17 is a flowchart illustrating auto-scaling host count changing processing;

FIG. 18 is a flowchart illustrating primary-secondary synchronization processing; and FIG. 19 is a flowchart illustrating storage access information collection processing.

DESCRIPTION OF EMBODIMENTS

Figure 1:
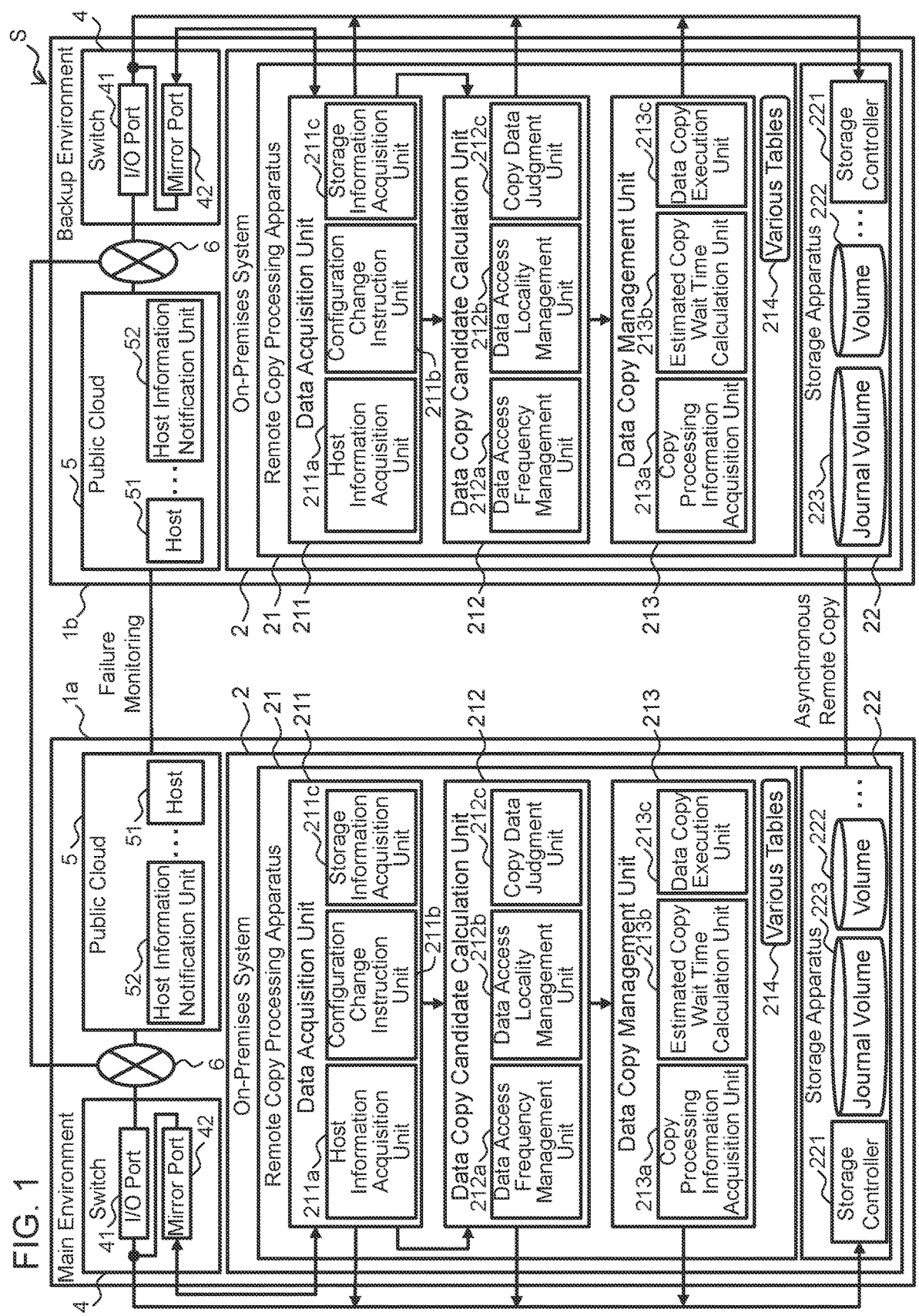
FIG. 1 is a diagram illustrating the configuration of a disaster control system according to an embodiment.

Embodiments of the present invention will be explained below with reference to the drawings. The embodiments are for illustrative purposes for explaining the present invention and some omissions and simplifications are made as necessary in order to clarify the explanation. The present invention can be also implemented in other various forms. Unless particularly restrained, each constituent element may be singular or plural.

If there are a plurality of constituent elements having the same function or similar functions, they may be sometimes explained by attaching different additional characters to the same reference numeral. Also, if it is unnecessary to distinguish these plurality of constituent elements, they may sometimes be explained by omitting the additional characters.

In embodiments, an explanation may be sometimes provided about a case where processing is performed by executing a program. Under this circumstance, a computer performs processing defined by the program while having a processor (such as a CPU (Central Processing Unit) or a GPU (Graphics Processing Unit)) execute the program and using, for example, storage resources (such as a memory) and interface devices (such as a communication port). Therefore, a subject of the processing to be performed by executing the program may be the processor. Similarly, the subject of the processing to be performed by executing the program may be a controller, apparatus, system, computer, or node having a processor. The subject of the processing to be performed by executing the program may only have to be an computing unit and may include a dedicated circuit for performing specific processing. The dedicated circuit herein means, for example, an FPGA (Field Programmable Gate Array), an ASIC (Application Specific Integrated Circuit), or a CPLD (Complex Programmable Logic Device).

The program may be installed from a program source into the computer. The program source may be, for example, a program distribution server or a computer-readable non-transitory recording medium. If the program source is a program distribution server, the program distribution server may include a processor and storage resources for storing an object program to be distributed and the processor for the program distribution server may distribute the object program to be distributed to other computers. Furthermore, in embodiments, two or more programs may be implemented as one program or one program may be implemented as two or more programs.

In the following embodiments, various kinds of information will be explained in a table format, but the various kinds of information may be in a format other than the table.

[Embodiments]

(Configuration of Disaster Control System S According to Embodiment)

FIG. 1 is a diagram illustrating the configuration of a disaster control system S according to an embodiment. The disaster control system S includes: a main environment 1*a* which is a hybrid cloud for an active system; and a backup environment 1*b* which is a hybrid cloud for a standby system. The backup environment 1*b* is a disaster environment to resume a system(s), which was in operation in the main environment 1*a*, and take over business processing when the main environment 1*a* fell into a situation where it is no longer capable of continuing operating the main environment 1*a* due to, for example, a disaster.

In this embodiment, it is assumed that the main environment 1*a* and the backup environment 1*b* have similar configurations; and the configuration of the backup environment 1*b* will be explained below and an explanation about the configuration of the main environment 1*a* will be sometimes omitted as necessary.

The backup environment 1*b* includes an on-premises system 2 and a public cloud 5 which are connected via a network 6. The on-premises system 2 is connected to the network via a switch (network switch) 4. The switch 4 has an I/O port 41 and a mirror port 42 which is a mirroring port for the I/O port 41.

The respective on-premises systems 2 of the main environment 1*a* and the backup environment 1*b* mutually perform failure monitoring via, for example, a dedicated closed network.

The public cloud 5 has one or more hosts 51 and a host information notification unit 52.

The on-premises system 2 has a remote copy processing apparatus 21 and a storage apparatus 22. The storage apparatus 22 accepts I/O access from a host(s) 51 in the public cloud 5 via the I/O port 41 and the network 6. Also, the remote copy processing apparatus 21 captures the I/O access from the host(s) 51 in the public cloud 5 to the storage apparatus 22 via the mirror port 42.

The remote copy processing apparatus 21 has a data acquisition unit 211, a data copy candidate calculation unit 212, a data copy management unit 213, and various tables 214.

Figure 3:
FIG. 3 is a diagram illustrating the structure of an autoscale and host correspondence management table.

The various tables 214 includes an auto-scale and host correspondence management table T1 (FIG. 3), a main reference count table T2 (FIG. 4), an auto-scale management table T3 (FIG. 5), a system resumption management table T4 (FIG. 6), a system priority management table T5 (FIG. 7), a data access frequency management table T6 (FIG. 8), a data access locality management table T7 (FIG. 9), a journal volume and meta data management table T8 (FIG. 10), and a data copy time management table T9 (FIG. 11) which are stored in a specified storage area.

(Auto-scale and Host Correspondence Management Table T1) The auto-scale and host correspondence management table T1 (FIG. 3) manages the correspondence relationship between auto-scale groups and hosts. The auto-scale and host correspondence management table T1 has columns of a "host ID" and an "auto-scale ID." The "host ID" is information for identifying the relevant host 51 which in operation in the public cloud 5. The "auto-scale ID" is information for identifying each system and information for identifying an auto-scale group to which each host 51 belongs.

(Main Reference Count Table T2)

The main reference count table T2 (FIG. 4) manages the number of references to the storage apparatus 22 in the main environment 1a with respect to each host 51. The main reference count table T2 has columns of a "host ID" and a "main reference count." The "host ID" is information for identifying the relevant host 51 which is in operation in the public cloud 5. The "main reference count" is the number of times when the host 51 which is identified by the "host ID" and which is in operation in the main environment 1a or is in operation in the resumed backup environment 1b referred to the data stored in the storage apparatus 22 for the main environment 1a within a certain period of time.

(Auto-scale Management Table T3)

The auto-scale management table T3 (FIG. 5) manages the quantity of hosts to be scaled out with respect to each auto-scale group. The auto-scale management table T3 has columns of an "auto-scale ID," a "default scale-out count," a "minimum scale-out count," a "maximum scale-out count," and an "auto-scaling host setting count (environment set value)." The "default scale-out count" is the quantity of hosts operated when activating or resuming the relevant system identified by the "auto-scale ID." The "minimum scale-out count" is the minimum quantity of hosts which can be scaled in by the system identified by the "auto-scale ID." The "maximum scale-out count" is the maximum quantity of hosts which can be scaled out by the system identified by the "auto-scale ID." The "auto-scaling host setting count (environment set value)" is the current quantity of hosts which are operated by the system identified by the "auto-scale ID." For example, when "auto-scale ID" is "system #1," the quantity of hosts to be operated upon activation or upon resumption is "20," the quantity of hosts can be increased or decreased between "5" and "60" by means of scale-out/scale-in, and the current quantity of hosts is "30."

(System Resumption Management Table T4)

The system resumption management table T4 (FIG. 6) manages whether or not each system has been resumed in the backup environment 1b. The system resumption management table T4 has columns of a "system ID" and a "resumed flag." A system whose "resumed flag" is "1" has been resumed in the backup environment 1b, while a system whose "resumed flag" is "0" has not been resumed in the backup environment 1b.

(System Priority Management Table T5)

The system priority management table T5 (FIG. 7) manages the resumption priority of each system. The "priority" indicates the priority of the relevant system identified by the "system ID" to be resumed in the backup environment 1b; and the smaller the value is, the more preferentially the relevant system will be resumed in the backup environment 1b. When the "priority" is "null," it indicates that the priority has not been set.

(Data Access Frequency Management Table T6)

The data access frequency management table T6 (FIG. 8) manages the "number of accesses" to each piece of data which is identified by the "data ID" stored in the storage apparatus 22 and which is accessed from the hosts 51.

(Data Access Locality Management Table T7)

The data access locality management table T7 (FIG. 9) manages the "number of accesses" to each piece of data which is identified by the "data ID" and with respect to each host 51 which is identified by the "host ID" and makes access to the relevant data.

(Journal Volume and Meta Data Management Table T8)

The journal volume and meta data management table T8 (FIG. 10) manages data write destinations in the storage apparatus 22 in the backup environment 1b. Journal data of the data identified by the "data ID" is stored in a copy destination of a journal volume 223 in the backup environment 1b which is identified by a "journal data storage place" and a "backup-side copy destination."

(Data Copy Time Management Table T9)

The data copy time management table T9 (FIG. 11) manages a "copy starting time of day," a "copy completion time of day," and a "data copy completion flag" with respect to each piece of data identified by the "data ID." The "copy starting time of day" is a time of day when the remote copy processing apparatus 21 issued an instruction to perform remote copy of the relevant data. The "copy completion time of day" is a time of day when the remote copy processing apparatus 21 received a remote copy update completion notice of the relevant data from the storage apparatus 22 in the backup environment 1b. Data regarding which the "copy starting time of day" and the "copy completion time of day" are "null" and the "data copy completion flag" is "0" is data which is waiting for the remote copy processing. Data regarding which the relevant time of day was registered at "copy starting time of day," the "copy completion time of day" is "null," and the "data copy completion flag" is "0" is data on which the remote copy processing is being executed. Data regarding which the relevant times of day were registered at the "copy starting time of day" and the "copy completion time of day" and the "data copy completion flag" is "1" is data on which the remote copy processing is completed.

Referring back to the explanation of FIG. 1, the data acquisition unit 211 has a host information acquisition unit 211a, a configuration change instruction unit 211b, and a storage information acquisition unit 211c.

The host information acquisition unit 211a acquires host information of the hosts 51 in the main environment 1a from the host information notification unit 52 in the main environment 1a via the network 6. The host information is, for example, critical information of the hosts 51, the quantity of the hosts 51, the host ID, and auto-scale information. A critical information acquisition path(s) may be either one of, or both, a path from the public cloud 5 in the main environment 1a to the public cloud 5 in the backup environment 1b, and then to the storage apparatus 22 in the backup environment 1b and a path from the public cloud 5 in the main environment 1a to the storage apparatus 22 in the main environment 1a, and then to the storage apparatus 22 in the backup environment 1b.

The configuration change instruction unit 211b issues a configuration change instruction to the public cloud 5 and the storage apparatus 22 in the backup environment 1b on the basis of storage information acquired by the storage information acquisition unit 211c when performing the remote copy processing of the data from the main environment 1a to the backup environment 1b. The configuration change of the public cloud 5 is scale-out/scale-in of the hosts 51. The configuration change of the storage apparatus 22 is to change the allocation of the ports 221c (FIG. 2) when using them during the remote copy processing, change the allocation of the cache memories 221b (FIG. 2) to the journal volume 223, and increase/decrease the number of parallel processing for the remote copy processing between the volumes 222 in the respective storage apparatuses 22 in the main environment 1a and the backup environment 1b.

The storage information acquisition unit 211c acquires the storage information from the storage apparatus 22 in the backup environment 1b. The storage information is a utilization rate of the port 221c (FIG. 2) for the storage apparatus 22 in the backup environment 1b to be used when performing the remote copy processing from the main environment 1a to the backup environment 1b and a utilization rate of the cache memory 221b (FIG. 2) for the journal volume 223.

The data copy candidate calculation unit 212 has a data access frequency management unit 212a, a data access locality management unit 212b, and a copy data judgment unit 212c. The data access frequency management unit 212a and the data access locality management unit 212b are one example of an access frequency information acquisition unit that acquires access frequency information regarding an access frequency from the host(s) 51 to each piece of data stored in the storage apparatus 22.

The data copy candidate calculation unit 212 acquires the data ID and the host ID with respect to each I/O access from the host 51 to the storage apparatus 22 via the data acquisition unit 211 and the mirror port 42. The data access frequency management unit 212a manages, in the data access frequency management table T6 (FIG. 8), the number of accesses which is relevant to the data ID acquired for each I/O access.

The data access locality management unit 212b manages, in the data access locality management table T7 (FIG. 9), the number of accesses that is relevant to the host ID and the data ID which are acquired for each I/O access.

The copy data judgment unit 212c executes copy data judgment processing described later (step S16 in FIG. 12).

The data copy management unit 213 has a copy processing information acquisition unit 213a, an estimated copy wait time calculation unit 213b, and a data copy execution unit 213c.

The copy processing information acquisition unit 213a executes the calculation of average copy time, an average arrival rate, and an average service rate as described later (step S21 in FIG. 15) with reference to the data copy time management table T9 (FIG. 11). The copy processing information acquisition unit 213a monitors, for example, the average copy time of data from the main environment 1a and an average arrival time interval of the copy processing.

The estimated copy wait time calculation unit 213b executes the calculation of estimated copy wait time as described later (step S22 in FIG. 15).

The data copy execution unit 213c executes data copy processing as described later (step S17 in FIG. 12).

The storage apparatus 22 has a storage controller 221, volumes 222, and the journal volume 223. The storage controller 221 makes data access to the volume 22 according to an I/O access from the host 51 and accumulates the data and update history information (journal data) in the journal volume 223. Incidentally, the storage apparatus 22 in the main environment 1a is called primary storage and the volume(s) 222 in the main environment 1a is called a primary volume(s). Also, the storage apparatus 22 in the backup environment 1b is called secondary storage and the volume(s) 222 in the backup environment 1b is called a secondary volume(s).

(Hardware Configuration of Disaster Control System S According to Embodiment)

Figure 2:
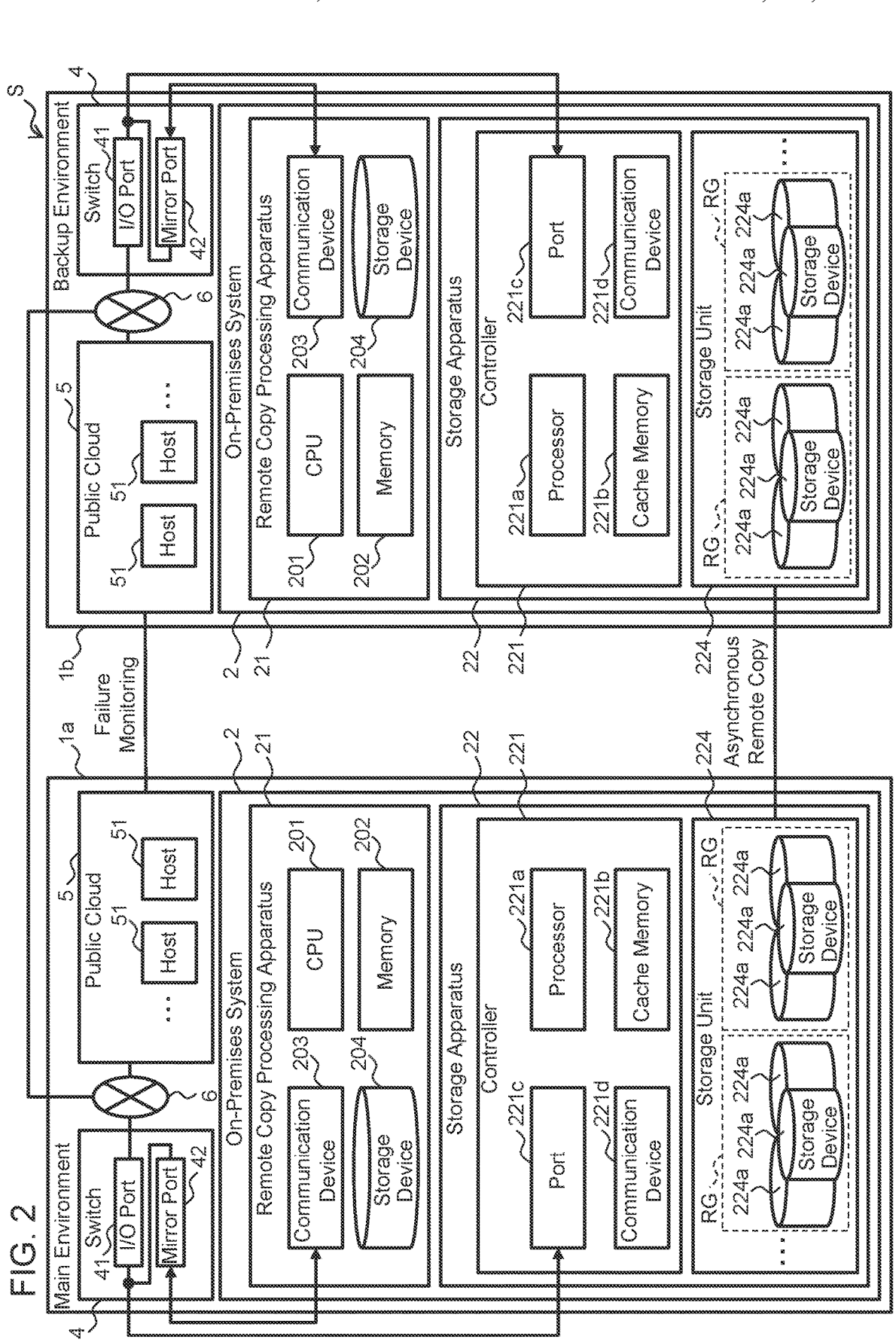
FIG. 2 is a diagram illustrating a hardware configuration of the disaster control system according to the embodiment.

FIG. 2 is a diagram illustrating a hardware configuration of the disaster control system S according to an embodiment. The remote copy processing apparatus 21 is a computer having a CPU 201, a memory 202, a communication device 203, and a storage device 204. The data acquisition unit 211, the data copy candidate calculation unit 212, and the data copy management unit 213 are implemented by the CPU 201 in cooperation with the memory 202 to execute programs. The communication device 203 is connected with the mirror port 42.

The storage apparatus 22 has the storage controller 221 and a storage unit 224. The storage controller 221 has a processor 221a, the cache memory 221b, the port 221c, and a communication device 221d. The port 221c accepts I/O access from the host 51 in the backup environment 1b and is also a port used for the remote copy processing of data from the storage apparatus 22 in the main environment 1a to the storage apparatus 22 in the backup environment 1b.

The storage unit 224 has one or more RAID (Redundant Arrays of Inexpensive Disks) groups RG. The RAID group RG is a management unit for managing one or more storage devices 224a which provide storage areas of the storage apparatus 22.

(Main Processing According to Embodiment)

Figure 12:
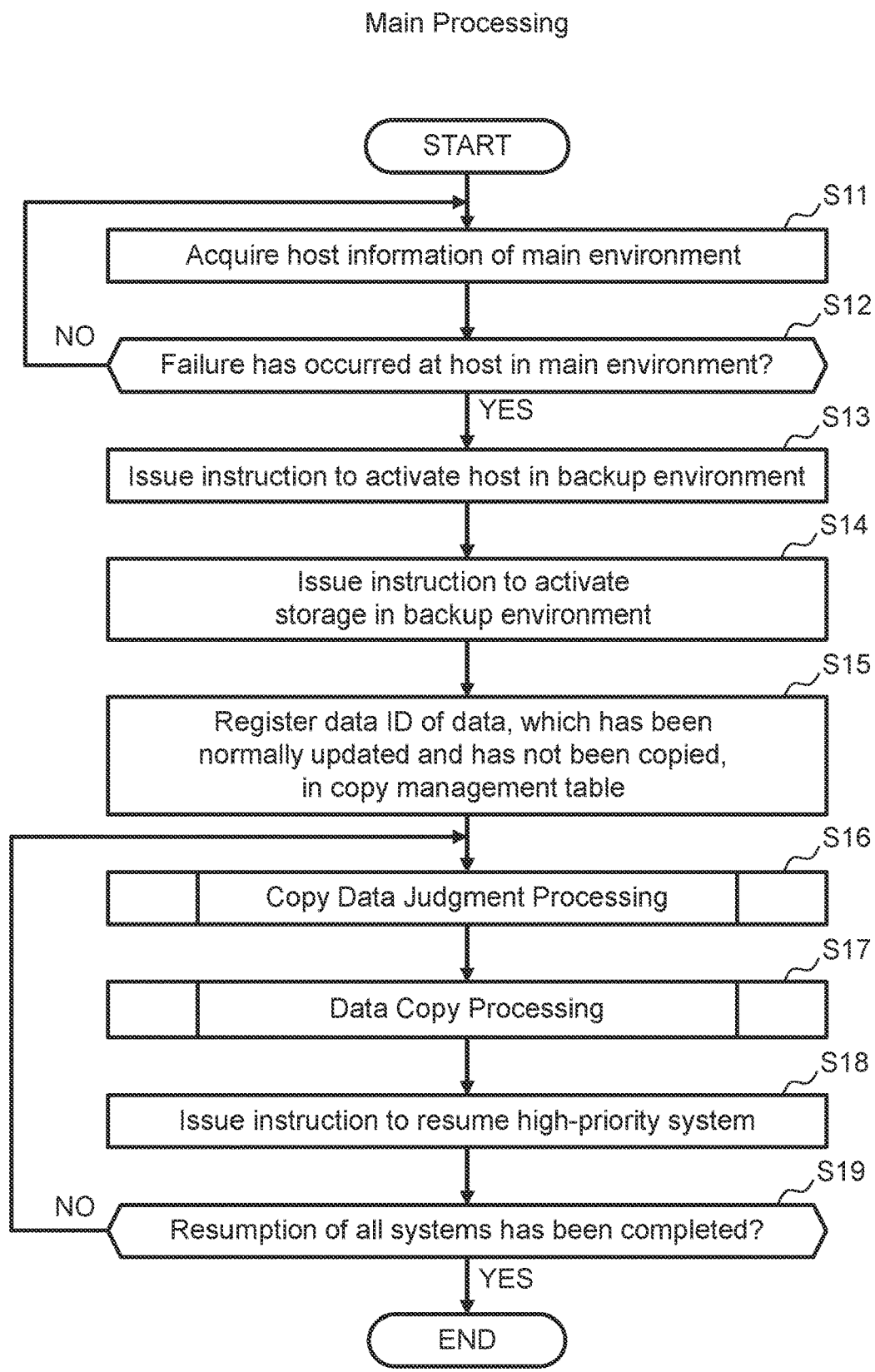
FIG. 12 is a flowchart illustrating main processing according to the embodiment.

FIG. 12 is a flowchart illustrating main processing at the disaster control system S according to an embodiment. FIG. 12 is executed by the on-premises system 2 in the backup environment 1b.

Firstly, in step S11, the host information acquisition unit 211a acquires the host information of the main environment 1a from the host information notification unit 52 of the main environment 1a.

Next in step S12, the host information acquisition unit 211a judges whether or not a failure has occurred in the public cloud 5 of the main environment 1a, on the basis of the host information acquired in step S11. For example, if the host information acquired in step S11 indicates that at least any one of the hosts 51 in the public cloud 5 has stopped, it is judged that the failure has occurred in the public cloud 5 of the main environment 1a. If the failure has occurred in the public cloud 5 of the main environment 1a (YES in step S12), the data acquisition unit 211 proceeds to the processing in step S13; and if the failure has not occurred (NO in step S12), the data acquisition unit 211 returns to the processing in step S11.

Figure 6:
FIG. 6 is a diagram illustrating the structure of a system resumption management table.
Figure 7:
FIG. 7 is a diagram illustrating the structure of a system priority management table.

In step S13, the configuration change instruction unit 211b issues an instruction to the public cloud 5 of the backup environment 1b to activate the quantity of hosts 51 required to resume a system with high priority among systems which were in operation in the public cloud 5 of the main environment 1a. The configuration change instruction unit 211b identifies a system(s) which has not been resumed in the backup environment 1b (the resumed flag is 0) in the system resumption management table T4 (FIG. 6), and which has the priority equal to or higher than a constant value in the system priority management table T5 (FIG. 7). Then, the configuration change instruction unit 211b identifies the default scale-out count of the host(s) 51 required to cause the identified system(s) to operate by referring to the system resumption management table T4 (FIG. 6). The configuration change instruction unit 211b issues an instruction to activate as many hosts 51 as the identified default scale-out count.

Then, in step S14, the configuration change instruction unit 211b issues an instruction to activate the storage apparatus 22 in the backup environment 1b. The storage apparatus 22 in the backup environment 1b which is activated in step S14 stores data which was synchronized last time with the primary storage (the storage apparatus 22 in the main environment 1a) before the detection of the failure of the public cloud 5 of the main environment 1a.

Subsequently, in step S15, the data copy management unit 213 compares the journal data of the journal volume 223 in the main environment 1a with that in the backup environment 1b. Then, the data copy management unit 213 refers to the data copy time management table T9 (FIG. 11) and registers the data ID of data, which was "normally updated" in the main environment 1a and which has not been copied from the main environment 1a to the backup environment 1b, in the data copy time management table T9 (FIG. 11).

The expression "normally updated" herein used means, for example, the case where when a plurality of pieces of block data are updated by one data writing processing, all the pieces of block data are successfully written. When a plurality of pieces of block data are updated by one data writing processing and only some pieces of block data are successfully written, the resultant data includes inconsistent block data and thereby cannot be recognized as being "normally updated" and is excluded from the registration of the data ID in the data copy time management table T9.

Figure 13:
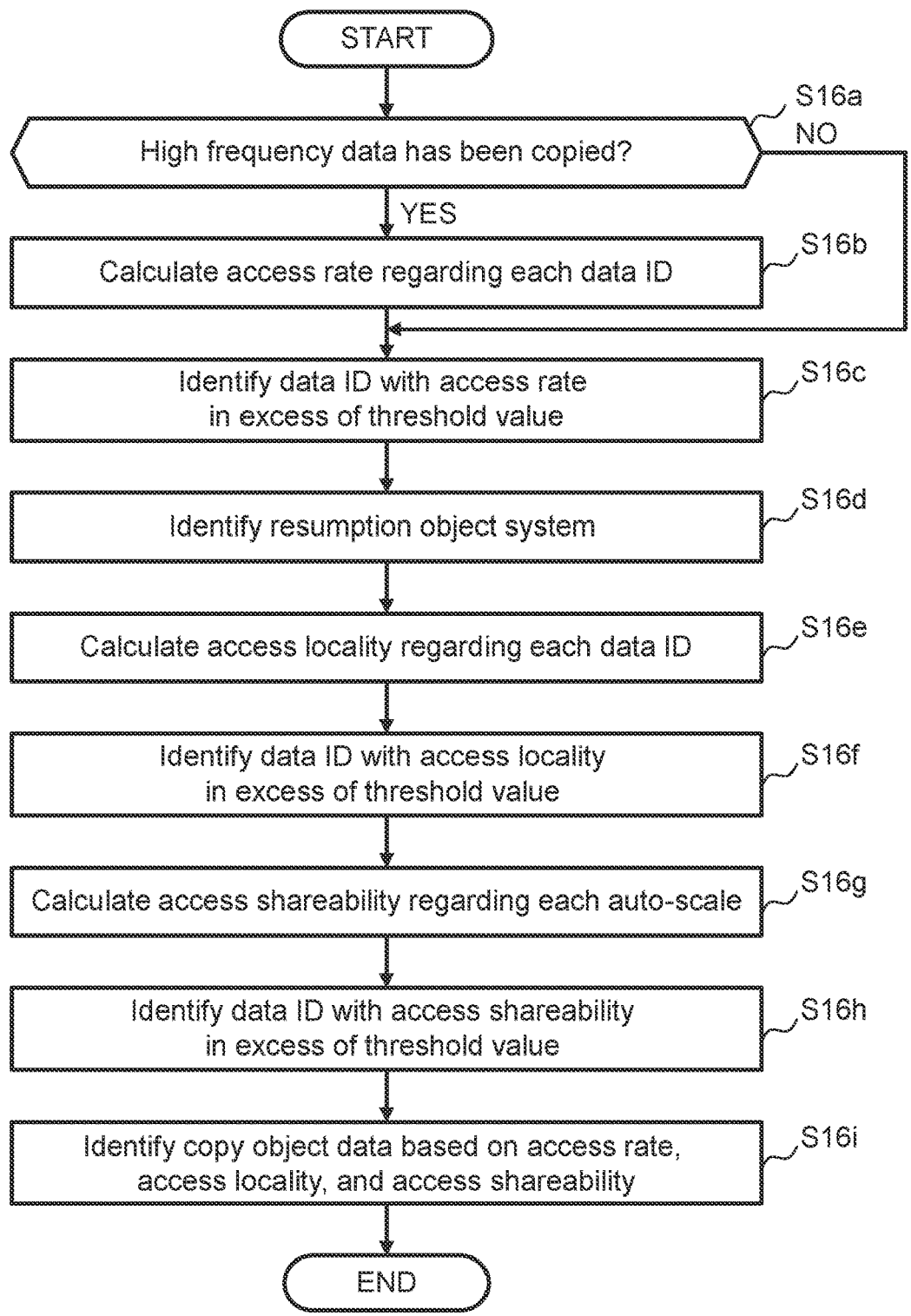
FIG. 13 is a flowchart illustrating the details of copy data judgment processing.

Then, in step S16, the data copy candidate calculation unit 212 executes the copy data judgment processing (FIG. 13). Next, in step S17, the data copy management unit 213 performs the data copy processing to the storage apparatus 22 (the secondary storage) in the backup environment 1b (FIG. 13). Subsequently, in step S18, the configuration change instruction unit 211b issues an instruction to the public cloud 5 of the backup environment 1b to resume the system with high priority which should be operated by the host(s) regarding which the activation instruction was issued in step S13.

Next, in step S17, the data acquisition unit 211 refers to the system resumption management table T4 (FIG. 6) and judges whether or not the resumption of all the systems, which were in operation in the main environment 1a, has been completed in the backup environment 1b. If the resumption of all the systems has been completed (YES in step S17), the data acquisition unit 211 terminates this main processing; and if the resumption of all the systems has not been completed (NO in step S17), the data acquisition unit 211 returns to the processing in step S16.

(Copy Data Judgment Processing)

FIG. 13 is a flowchart illustrating the details of the copy data judgment processing (step S16 in FIG. 12). The copy data judgment processing identifies data regarding which the data copying should be performed from the storage apparatus 22 in the main environment 1a to the storage apparatus 22 in the backup environment 1b, on the basis of update data since the last time asynchronous copying was performed, in consideration of conditions of data access frequency from the hosts 51, data access locality and access shareability at the time of auto-scaling in the priority order of the systems.

Firstly, in step S16a, the copy data judgment unit 212c judges whether "high frequency data" has been copied or not. The "high frequency data" is data which satisfies Expression (1).

$$\text{Threshold Value} < \text{The Number of Accesses to The Relevant Data}/\text{Total Number of Accesses to All Pieces of Data} \qquad (1)$$

Figure 8:
FIG. 8 is a diagram illustrating the structure of a data access frequency management table.

The "Total Number of Accesses to All Pieces of Data" which is a denominator of the right side of Expression (1) is the total sum of the "number of accesses" in the data access frequency management table T6 (FIG. 8). The "Number of Accesses to The Relevant Data" which is a numerator of the right side of Expression (1) is the "number of accesses" for each "data ID" in the data access frequency management table T6 (FIG. 8).

Specifically speaking, the copy data judgment unit 212c judges, based on the number of accesses in the data access frequency management table T6 (FIG. 8), whether or not the data which corresponds to the "high frequency data" has "1" as the "data copy completion flag" in the data copy time management table T9 (FIG. 11). If the "high frequency data" has been copied (YES in step S16a), the copy data judgment unit 212c proceeds to the processing in step S16d; and if the "high frequency data" has not been copied (NO in step S16a), the copy data judgment unit 212c proceeds to the processing in step S16b.

In step S16b, the copy data judgment unit 212c refers to the data access frequency management table T6 (FIG. 8) and calculates the "access rate" (the right side of Expression (1)) with respect to each data ID. Then, in step S16c, the copy data judgment unit 212c identifies the data ID of the "high frequency data" whose "access rate" exceeds the threshold value, according to Expression (1). Data which is referenced with high frequency as the entire system can be identified by the "high frequency data."

Next, in step S16d, the copy data judgment unit 212c identifies a system with the highest priority among the systems which have not been resumed, as a target system to be resumed. Specifically speaking, the copy data judgment unit 212c identifies the system with the highest priority in the system priority management table T5 (FIG. 7) among the systems which have "0" (not resumed) as the "resumed flag" in the system resumption management table T4 (FIG. 6), as the target system to be resumed.

Then, in step S16e, the copy data judgment unit 212c refers to the auto-scale and host correspondence management table T1 (FIG. 3) and the data access locality management table T7 (FIG. 9) and calculates the "access locality" with respect to each data ID. The "access locality" with respect to each data ID can be found from the right side of Expression (2).

$$\text{Threshold Value} < \text{Total Number of Accesses from Respective Hosts for Target System To Be Resumed}/\text{Total Number of Accesses to The Relevant Data} \qquad (2)$$

The "Total Number of Accesses to The Relevant Data" which is a denominator of the right side of Expression (2) is the total sum of the "number of accesses" with respect to each same "data ID" in the data access locality management table T7 (FIG. 9). The "Total Number of Accesses from Respective Hosts for Target System To Be Resumed" which is a numerator of the right side of Expression (2) is the total sum of the "number of accesses" to make access from the hosts with the respective "host IDs" belonging to the target system to be resumed (the auto-scale ID) to each piece of the "Relevant Data" in the denominator of the right side of Expression (2). Specifically speaking, the "access locality" with respect to each data ID indicates at how much ratio to a certain piece of data each host for the target system to be resumed makes access to such data. The data which is locally referenced by the host(s) for the target system to be resumed is identified by the "access locality.".

For example, in FIG. 9, let us assume that the target system to be resumed is "system #1" and the relevant data is "#2." In this case, records of the data access locality management table T7 (FIG. 9) whose "host ID" and "data ID" are "Host #2" and "#2" and "Host #4" and "#2" correspond to the "Total Number of Accesses to The Relevant Data" which is the denominator of Expression (2), so that the result is "22"+"50"=72. Moreover, a record of the data access locality management table T7 (FIG. 9) whose "host ID" and "data ID" are "Host #2" and "#2" corresponds to the "Total Number of Accesses from Respective Hosts for Target System To Be Resumed" which is the numerator of Expression (2), so that the result is "22." Therefore, if the target system to be resumed is "system #1" and the relevant data is "#2," the "access locality" with respect to each data ID on the right side of Expression (2) is 22/72.

Next, in step S16f, the copy data judgment unit 212c identifies the data ID whose "access locality" exceeds the threshold value as in Expression (2).

Subsequently, in step S16g, the copy data judgment unit 212c calculates the "access shareability" with respect to each auto-scale. The copy data judgment unit 212c refers to the auto-scale and host correspondence management table T1 (FIG. 3) and the data access locality management table T7 (FIG. 9) and calculates the "access shareability" with respect to each auto-scale. The "access shareability" with respect to each auto-scale can be found from the right side of Expression (3).

Threshold Value<Total Sum of The Number of
Accesses from Auto-scaling Hosts to The Relevant Data/The Total Number of Accesses by
Auto-scaling Hosts     (3)

The "Total Number of Accesses by Auto-scaling Hosts" which is the denominator of the right side of Expression (3) is the total sum of the "number of accesses" of the "host IDs" belonging to the same auto-scale group in the data access locality management table T7 (FIG. 9). The "Total Sum of The Number of Accesses from Auto-scaling Hosts to The Relevant Data" which is the numerator of the right side of Expression (3) is the total sum of the "number of accesses" by each auto-scale group accessing the relevant data. Specifically speaking, the data which is referenced by the auto-scaling hosts in common with each other is identified by the "access shareability" with respect to each auto-scale.

For example, let us assume that the relevant data is "#2" in FIG. 9. In this case, regarding the "Total Number of Accesses by Auto-scaling Hosts" which is the denominator of Expression (3), the total sum of the number of accesses by the auto-scale group of "system #1" to which "Host #1" and "Host #2" belong is "20"+"22"=42 and the total sum of the number of accesses by the auto-scale group of "system #2" to which "Host #3," "Host #4," and "Host #5" belong is "20"+"50"+"10"=80, so that the obtained result is 42+80=122. Moreover, records of "Host #2" and "#2" and "Host #4" and "#2" correspond to the "Total Sum of The Number of Accesses from Auto-scaling Hosts to The Relevant Data" which is the numerator of Expression (3), so that the obtained result is "22"+"50"=72. Therefore, if the relevant data is"#2," the "access shareability" with respect to each auto-scale on the right side of Expression (3) is 72/122.

Then, in step S16h, the copy data judgment unit 212c identifies the data ID with the "access shareability in excess of the threshold value as in Expression (3).

Subsequently, in step S16i, the copy data judgment unit 212c decides copy object data on the basis of the "access rate," the "access locality," and the "access shareability." For example, the copy object data is data regarding which at least any one or all of the "access rate," the "access locality," and the "access shareability" exceed their respective threshold values.

(Details of Data Copy Processing)

Figure 14:
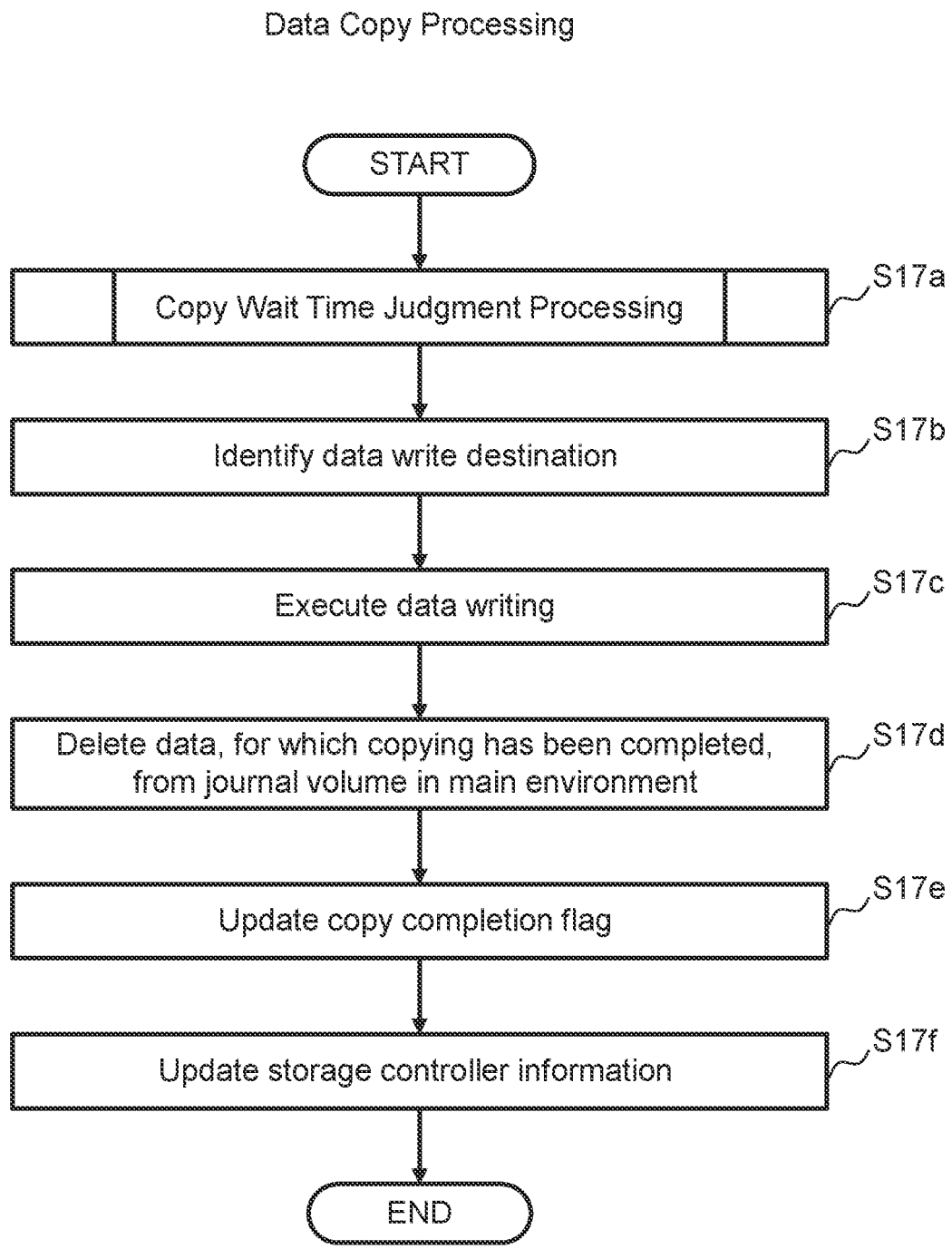
FIG. 14 is a flowchart illustrating the details of data copy processing.

FIG. 14 is a flowchart illustrating the details of the data copy processing (step S17 in FIG. 12). In the data copy processing, the data copy is performed from the storage apparatus 22 in the main environment 1a to the storage apparatus 22 in the backup environment 1b.

Firstly, in step S17a, the data copy execution unit 213c executes copy wait time judgment processing. The details of the copy wait time judgment processing will be described later with reference to FIG. 15.

Then, in step S17b, the data copy execution unit 213c identifies a data write destination in the storage apparatus 22 in the backup environment 1b by referring to the journal volume and meta data management table T8 (FIG. 10) in the backup environment 1b.

Next, in step S17c, the data copy execution unit 213c issues an instruction to the storage apparatus 22 to start executing the data copy to the storage apparatus 22 which is the data write destination as identified in step S17b.

Subsequently, in step S17d, the data copy execution unit 213c deletes the data whose copying has been completed, from the journal volume 223 in the main environment 1a.

Then, in step S17e, the data copy execution unit 213c changes the copy completion flag in the data copy time management table T9 (FIG. 11) in the backup environment 1b to "1" (completed).

Next, in step S17f, the data copy execution unit 213c records a storage place of the data after the data copy in the storage controller 221 for the storage apparatus 22 in the backup environment 1b and updates controller information. When step S17f terminates, the access to the data, which has been copied from the public cloud 5 to the storage apparatus 22, is resumed in the backup environment 1b and the target system to be resumed is resumed.

Incidentally, when the data to be referenced has been copied to the storage apparatus 22 in the backup environment 1b, the hosts 51 in the backup environment 1b access the storage apparatus 22 in the backup environment 1b.

On the other hand, if the data to be referenced has not been copied to the storage apparatus 22 in the backup environment 1b, the storage apparatus 22 in the main environment 1a performs fallback operation and the host(s) 51 in the backup environment 1b can access the relevant data only when that host 51 refers to the relevant data for the first time. Then, the hosts 51 in the backup environment 1b inserts an instruction to copy the relevant data, which has not been copied, into the queue of the data copy management unit 213 in the backup environment 1b and sequentially execute the remote copy processing. When the host(s) 51 in the backup environment 1b refers to the relevant data again, it accesses the storage apparatus 22 in the backup environment 1b where the data which has been copied from the storage apparatus 22 in the main environment 1a is stored.

(Copy Wait Time Judgment Processing)

Figure 15:
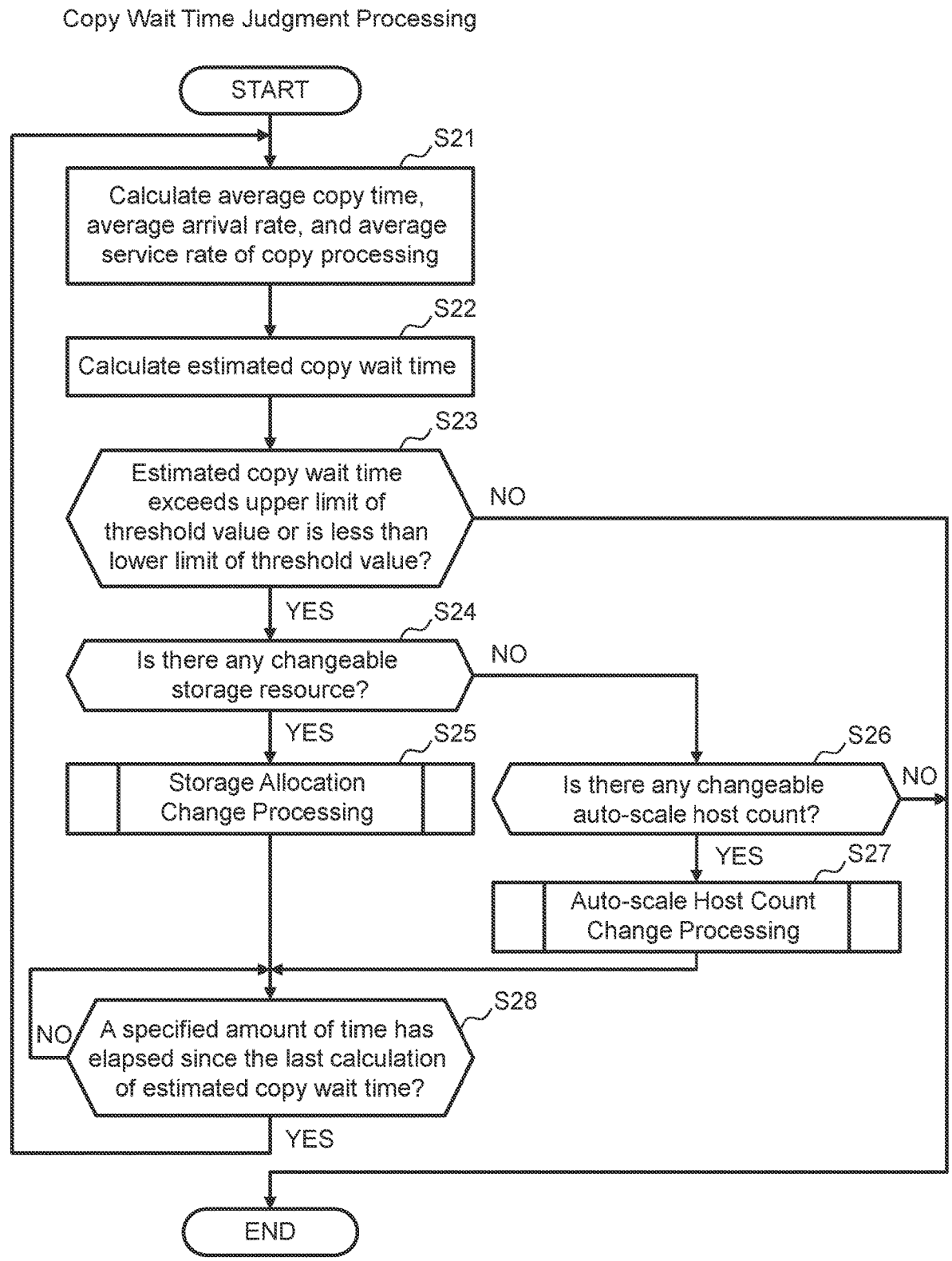
FIG. 15 is a flowchart illustrating the details of copy wait time judgment processing.

FIG. 15 is a flowchart illustrating the details of the copy wait time judgment processing (step S18 in FIG. 12). The copy wait time judgment processing is executed by the data copy processing (FIG. 14) in the middle of resuming the systems and is also executed regularly after the resumption of all the systems. As the copy wait time judgment processing is executed after the resumption of all the systems, the auto-scaling host setting count is decreased and data copy frequency is suppressed. A system which will reduce the maximum quantity of hosts is selected under the conditions of the system priority and the number of references to the main environment.

Firstly, in step S21, the copy processing information acquisition unit 213a refers to the data copy time management table T9 (FIG. 11) and calculates average data copy time of the copy processing, an average arrival rate of the copy processing, and an average service rate of the copy processing.

The average data copy time of the copy processing herein used is an average of time of the copy processing executed within a certain amount of time (from the copy instruction by the data copy management unit 213 in the backup environment 1b to the completion of the data update to the storage apparatus 22 in the backup environment 1b).

The average arrival rate of the copy processing is the number of copy instructions per unit time which were output from the data copy management unit 213 in the backup environment 1b to the main environment 1a within the certain amount of time. The average arrival rate of the copy processing is a reciprocal of the average arrival time of the copy instruction; and, for example, if one copy instruction is output per 3 minutes (if the average arrival time of the copy instruction is 3 minutes), the average arrival rate of the copy processing is ⅓ [time/minutes].

The average service rate of the copy processing is the number of executions of the copy processing per unit time and is a reciprocal of the average data copy time of the copy processing. For example, if the average data copy time of the copy processing is 4 minutes, the average service rate of the copy processing is ¼ [time/minutes].

Then, in step S22, the estimated copy wait time calculation unit 213b calculates the estimated copy wait time according to Expression (4).

$$\text{Estimated Copy Wait Time} = \text{Average Data Copy Time of Copy Processing} \times \rho/(1-\rho) \qquad (4)$$

where $\rho$(Average Utilization Rate)=(Average Arrival Rate of Copy Processing)/(Average Service Rate of Copy Processing)

Next, in step S23, the estimated copy wait time calculation unit 213b judges whether the estimated copy wait time calculated in step S22 exceeds an upper limit of a threshold value or is less than a lower limit of the threshold value. The threshold value used herein is a preset value range which can satisfy SLA (Service Level Agreement) of response performance of the system(s) with high priority. Incidentally, if the systems are being resumed, the speed for conducting the resumption of all the systems promptly is prioritized and the judgment on whether the estimated copy wait time is less than the lower limit of the threshold value is not performed. On the other hand, after the resumption of all the systems, by performing both the judgments to judge whether the estimated copy wait time exceeds the upper limit of the threshold value or is less than the lower limit of the threshold value, an appropriate amount of storage resources and host resources can be always used by the storage allocation changing processing (step S25) and the auto-scaling host count changing processing (step S27).

If the estimated copy wait time exceeds the upper limit of the threshold value or is less than the lower limit of the threshold value (YES in step S23), the estimated copy wait time calculation unit 213b proceeds to the processing in step S24; and if the estimated copy wait time is equal to or less than the lower limit of the threshold value and is equal to or more than the lower limit of the threshold value (NO in step S23), the estimated copy wait time calculation unit 213b terminates this copy wait time judgment processing.

Then, in step S24, the data copy execution unit 213c causes the configuration change instruction unit 211b (FIG. 1) to judge whether or not there are changeable resources for the storage apparatus 22. The changeable resources for the storage apparatus 22 are the cache memories 221b (FIG. 2) for the storage apparatus 22, the ports 221c (FIG. 2) for the data copy, and the number of parallel processing for the copy processing when copying the volume 222 in the main environment 1a to the volume 222 in the backup environment 1b.

If there are changeable resources for the storage apparatus 22 (YES in step S24), the data copy execution unit 213c proceeds to the processing in step S25; and if there are no changeable resources for the storage apparatus 22 (step S24NO), the data copy execution unit 213c proceeds to the processing in step S26.

In step S25, the data copy execution unit 213c causes the configuration change instruction unit 211b to perform storage allocation changing processing. The details of the storage allocation changing processing will be described later with reference to FIG. 16.

On the other hand, in step S26, the data copy execution unit 213c causes the configuration change instruction unit 211b to judge whether there is any changeable auto-scaling host count. If there is a changeable auto-scaling host count (YES in step S26), the data copy execution unit 213c proceeds to the processing in step S27; and if there is no changeable auto-scaling host count (NO in step S26), the data copy execution unit 213c terminates this copy wait time judgment processing.

In step S27, the data copy execution unit 213c causes the configuration change instruction unit 211b to perform auto-scaling host count changing processing. The details of the auto-scaling host count changing processing will be described later with reference to FIG. 17.

In step S28 following steps S25 and S27, the data copy execution unit 213c judges whether a specified amount of time has elapsed since the last calculation of the estimated copy wait time in step S22. If the specified amount of time has elapsed since the last calculation of the estimated copy wait time (YES in step S28), the copy data judgment unit 212c returns to the processing in step S21; and if the specified amount of time has not elapsed (NO in step S28), the copy data judgment unit 212c repeats step S28.

If the estimated copy wait time exceeds the threshold value range (YES in step S23) even after changing the storage apparatus 22 or the auto-scaling host count, the resumption of the target system to be resumed is put on hold until the estimated copy wait time becomes within the threshold value range, by repeating the loop from step S21 to step S28.

(Storage Allocation Changing Processing)

FIG. 16 is a flowchart illustrating the details of the storage allocation changing processing. The storage allocation changing processing is processed differently between the case where the estimated copy wait time exceeds the upper limit of the threshold value and the case where the estimated copy wait time is less than the lower limit of the threshold value, in step S23 in FIG. 15. An explanation will be provided below about the case where the estimated copy wait time value exceeds the upper limit of the threshold value.

Firstly, in step S25a, the configuration change instruction unit 211b (FIG. 1) judges whether the utilization rate of the port 221c (FIG. 1) for the data copy exceeds a threshold value or not. If the utilization rate of the port 221c for the data copy exceeds the threshold value (YES in step S25a), the configuration change instruction unit 211b proceeds to the processing in step S25b; and if the utilization rate is equal to or smaller than the threshold value (NO in step S25), the configuration change instruction unit 211b proceeds to the processing in step S25c.

In step S25b, the configuration change instruction unit 211b changes the allocation of the port 221c. To change the allocation of the port 221c, for example, part of the traffic of the port whose utilization rate exceeds the threshold value is allocated to a port with a lower utilization rate or a new port.

Specifically speaking, if the estimated copy wait time value exceeds the upper limit of the threshold value (YES in step S23 in FIG. 15) and if there is the port 221c for the data copy whose utilization rate exceeds the threshold value, there is a possibility that that port may be a bottleneck against the copy processing and, therefore, its load is distributed to another port 221c.

In step S25c, the configuration change instruction unit 211b judges whether the utilization rate of the cache memory 221b (FIG. 2) exceeds a threshold value or not. If the utilization rate of the cache memory 221b exceeds the threshold value (YES in step S25c), the configuration change instruction unit 211b proceeds to the processing in step S25d; and if the utilization rate is equal to or smaller than the threshold value (NO in step S25c), the configuration change instruction unit 211b proceeds to the processing in step S25e. In step S25d, the configuration change instruction unit 211b increases the capacity of a logical partition for the cache memory 221b to be allocated to the copy processing.

In step S25e, the configuration change instruction unit 211b increases the number of parallel processing for the copy processing, when copying the volume 222 in the main environment 1a to the volume 222 in the backup environment 1b, within the range which can be set for the storage apparatus 22.

Incidentally, if the estimated copy wait time is less than the lower limit of the threshold value in step S23 in FIG. 15, the configuration change instruction unit 211b judges whether the utilization rate of the port 221c for the data copy is equal to or smaller than the threshold value or not, in step S25a. If the utilization rate of the port 221c for the data copy is smaller than the threshold value (YES in step S25a), for example, the configuration change instruction unit 211b aggregates ports with a low utilization rate within the upper limit of the utilization rate of the port. Specifically speaking, if the estimated copy wait time value is less than the lower limit of the threshold value (YES in step S23 in FIG. 15) and if there is/are the port(s) 221c for the data copy, whose utilization rate is smaller than the threshold value, more ports 221c than the required quantity are used, so that the load is aggregated to another port 221c.

Moreover, if the estimated copy wait time is less than the lower limit of the threshold value in step S23 in FIG. 15, whether the utilization rate of the cache memory 221b (FIG. 2) is equal to or smaller than the threshold value or not is judged in step S25c. If the utilization rate of the cache memory 221b is equal to or smaller than the threshold value, the configuration change instruction unit 211b reduces the capacity of the logical partition for the cache memory 221b to be allocated to the copy processing.

Furthermore, if the estimated copy wait time value is less than the lower limit of the threshold value in step S23 in FIG. 15, the configuration change instruction unit 211b reduces the number of parallel processing for the copy processing, when copying the volume 222 in the main environment 1a to the volume 222 in the backup environment 1b, within the range which can be set for the storage apparatus 22 in step S25e.

(Auto-scaling Host Count Changing Processing)

FIG. 17 is a flowchart illustrating the auto-scaling host count changing processing. The auto-scaling host count changing processing is processed differently between the case where the estimated copy wait time exceeds the upper limit of the threshold value and the case where the estimated copy wait time is less than the lower limit of the threshold value, in step S23 in FIG. 15. An explanation will be provided below about the case where the estimated copy wait time value exceeds the upper limit of the threshold value.

Firstly, in step S27a, the configuration change instruction unit 211b (FIG. 1) refers to the system priority management table T5 (FIG. 7), acquires priority information of each system, and identifies a low priority system whose priority is less than a constant value.

Then, in step S27b, the configuration change instruction unit 211b refers to the auto-scale and host correspondence management table T1 (FIG. 3) and acquires host and auto-scale group information of the low priority system identified in step S27a. The auto-scale group information is information of hosts which are linked to an auto-scale group of each system. In an example of FIG. 3, Host #1, Host #2, and Host #3 are linked to the auto-scale group of system #1.

Next, in step S27c, the configuration change instruction unit 211b refers to the main reference count table T2 (FIG. 4) and acquires reference count information of the storage apparatus 22 in the main environment 1a of each host for the low priority system acquired in step S27b.

Subsequently, in step S27d, the configuration change instruction unit 211b identifies the low priority system with a large number of references to the storage apparatus 22 in the main environment 1a as a host count setting change object. Then, in step S27e, the configuration change instruction unit 211b issues a setting change instruction to the public cloud 5 to decrease the auto-scaling host setting count (environment set value) of the host count setting change object while satisfying the condition of being equal to or more than the minimum scale-out count in the auto-scale management table T3 (FIG. 5). The minimum scale-out count is a preset value depending on the requirements for each system. For example, regarding a system which completely stops the processing when the processing of other systems are under strain the minimum scale-out count is set as 0. Moreover, regarding a system which essentially requires redundancy in order to maintain availability even during a fallback operation, the minimum scale-out count is set as 2.

Figure 4:
FIG. 4 is a diagram illustrating the structure of a main reference count table.

An explanation will be provided about a specific example of the auto-scaling host count changing processing when the estimated copy wait time exceeds the upper limit of the threshold value in step S23 in FIG. 15. The main reference count with respect to each system is calculated from the auto-scale and host correspondence management table T1 (FIG. 3) and the main reference count table T2 (FIG. 4). Next, a system to reduce the auto-scaling host setting count (the environment set value) is selected under the conditions of the system priority and the main reference count. As an example of the conditions, the system with the system priority equal to or less than 2 and the largest main reference count in the system priority management table T5 (FIG. 7) is selected. In a case of the tables in FIG. 3, FIG. 4, and FIG. 7, the total sums of the main reference count with respect to the respective hosts for systems #2 and #3 with the system priority equal to or less than 2 (their total sums are "16" and "30") are compared with each other and it is decided to reduce the auto-scaling host setting count (the environment set value) of system #3.

Incidentally, if the estimated copy wait time is less than the lower limit of the threshold value in step S23 in FIG. 15, in step S27e, the configuration change instruction unit 211b issues a setting change instruction to the public cloud 5 to increase the auto-scaling host setting count (the environment set value) of the host count setting change object while satisfying the condition that it should be equal to or less than the maximum scale-out count. The maximum scale-out count is a preset value depending on the requirements for each system.

An explanation will be provided about a specific example of the auto-scaling host count changing processing in the case where the estimated copy wait time is less than the lower limit of the threshold value in step S23 in FIG. 15. The main reference count with respect to each system is calculated from the auto-scale and host correspondence management table T1 (FIG. 3) and the main reference count table T2 (FIG. 4). Next, a system to increase the auto-scaling host setting count (the environment set value) is selected under the conditions of the system priority and the main reference count. As an example of the conditions, the system with the system priority equal to or less than 2 and the largest main reference count in the system priority management table T5 (FIG. 7) is selected. In the case of the tables in FIG. 3, FIG. 4, and FIG. 7, the total sums of the main reference count with respect to the respective hosts for systems #2 and #3 with the system priority equal to or less than 2 (their total sums are "16" and "30") are compared with each other and it is decided to increase the auto-scaling host setting count (the environment set value) of system #3.

(Primary-Secondary Synchronization Processing)

FIG. 18 is a flowchart for illustrating primary-secondary synchronization processing. The primary-secondary synchronization processing is to copy data which has not been copied as the object data and which has not been referenced by the hosts 51 since the system was resumed; and the primary-secondary synchronization processing is executed at specified synchronization timing, for example, outside system service hours.

Firstly, in step S31, the data copy execution unit 213c (FIG. 1) acquires the data ID of data which has not been copied from the storage apparatus 22 in the main environment 1a. Then, in step S32, the data copy execution unit 213c copies the data with the data ID identified in step S31 to the storage apparatus 22 in the backup environment 1b.

Next, in step S33, the data copy execution unit 213c records a storage place of the data after the data copy in the storage controller 221 for the storage apparatus 22 in the backup environment 1b and updates the controller information.

Subsequently, in step S34, when the data copy in step S32 is completed with respect to all the data IDs identified in step S31, the data copy execution unit 213c switches between the primary and secondary storage, that is, the respective storage apparatuses 22 in the main environment 1a and the backup environment 1b. Specifically speaking, the storage apparatus 22 in the main environment 1a which served as the primary storage is changed to the secondary storage and the storage apparatus 22 in the backup environment 1b which served as the secondary storage is changed to the primary storage and the main environment 1a is switched to the backup environment 1b.

(Storage Access Information Collection Processing)

FIG. 19 is a flowchart for illustrating storage access information collection processing. The storage access information collection processing is executed regularly in the main environment 1a and the backup environment 1b respectively, regardless of other processing.

Firstly, in step S41, the data acquisition unit 211 performs mirroring of the ports and acquires the data ID, the host ID, and the system ID of data accessed from the host(s) 51 to the storage apparatus 22 with respect to each I/O access. Then, in step S42, the data access frequency management unit 212a records the number of accesses with respect to each data ID in the data access frequency management table T6 (FIG. 8) on the basis of the information acquired in S41.

Subsequently, in step S43, the data access locality management unit 212b records the number of accesses with respect to each host ID and each data ID in the data access locality management table T7 (FIG. 9) on the basis of the information acquired in step S41. Then, in step S44, the data acquisition unit 211 records the association between the host ID and the system ID in the auto-scale and host correspondence management table T1 (FIG. 3) on the basis of the information acquired in step S41.

(Advantageous Effects of Embodiment)

In this embodiment, when executing the asynchronous data copying between the primary and secondary storage in the main environment and the backup environment in the hybrid cloud, data which should be copied preferentially is judged based on the priority of the system, the access frequency of the data from the hosts, the access locality of the data, and the access shareability of the data upon the auto-scaling. Therefore, according to this embodiment, the system with high priority can be resumed early on the backside environment side by using the data which has been copied preferentially.

Furthermore, in this embodiment, the data copy time from the main environment and the average arrival time interval of the copy processing are monitored; and the storage resource allocation is changed, the resumption of the system(s) with low priority is stopped, and the host auto-scale count is changed on the backup environment side according to the estimated copy processing wait time. Therefore, in this embodiment, it is possible to prevent the delay in resuming the system(s) with high priority and suppress wasteful consumption of the resources in the entire system(s).

Furthermore, according to this embodiment, a business system constructed in the hybrid cloud including a hybrid cloud configuration where dynamic scale-out/scale-in occurs can be resumed in the hybrid cloud on the backup side, while minimizing the RPO (Recovery Point Objective) and RTO (Recovery Time Objective) and suppressing the cost.

(Other Embodiments)

This embodiment has described the example in which the remote copy processing apparatus 21 is constructed in a server outside the storage apparatus 22; however, the remote copy processing apparatus 21 may be constructed in the storage apparatus 22 or in the public cloud 5. In this case, the mirror port 42 can be omitted.

Furthermore, this embodiment has described the cloud which configures the hybrid cloud, as the public cloud 5, but it may be a private cloud.

The present invention is not limited to the aforementioned embodiments, but includes various variations. For example, the aforementioned embodiments have been described in detail in order to explain the present invention in an easily comprehensible manner and are not necessarily limited to those having all the configurations explained above. Furthermore, unless any contradiction occurs, part of the configuration of a certain embodiment can be replaced with the configuration of another embodiment and the configuration of another embodiment can be added to the configuration of a certain embodiment. Also, regarding part of the configuration of each embodiment, it is possible to add, delete, replace, integrate, or distribute the configuration. Furthermore, the configurations and processing indicated in the embodiments can be distributed, integrated, or replaced as appropriate on the basis of processing efficiency or implementation efficiency.

REFERENCE SIGNS LIST

S: disaster control system
1a: main environment
1b: backup environment
2: on-premises system
5: public cloud
21: remote copy processing apparatus
22: storage apparatus
51: host(s)
52: host information notification unit
211: data acquisition unit
211a: host information acquisition unit
211b: configuration change instruction unit
211c: storage information acquisition unit
212: data copy candidate calculation unit
212a: data access frequency management unit
212b: data access locality management unit
212c: copy data judgment unit
213: data copy management unit
213a: copy processing information acquisition unit
213b: estimated copy wait time calculation unit
213c: data copy execution unit
221b: cache memory
221c: port(s)
222: volume(s)
223: journal volume

The invention claimed is:

1. An information processing apparatus in a hybrid cloud having a cloud provided with a host or hosts where a system or systems are in operation, and a storage apparatus which is provided at other than the cloud and from and to which the host reads and writes data, the information processing apparatus for executing remote copy processing of data from a main environment hybrid cloud to the hybrid cloud,
wherein the main environment hybrid cloud has a cloud provided with a main environment host where the system or systems are in operation, and a main environment storage apparatus which is provided at other than the cloud and from and to which the main environment host reads and writes data,
the information processing apparatus comprising:
at least one processor which when executing at least one program configures the at least one processor to:
acquire access frequency information regarding an access frequency from the host to each piece of data stored in the storage apparatus;
judge object data of the remote copy processing on the basis of a priority of the system and the access frequency information;
issue an instruction to the storage apparatus to start executing the remote copy processing of the object data;
acquire host information of the main environment host;
issue an instruction to activate the host and the storage apparatus and also issue an instruction to change a quantity of hosts to perform scale-in/scale-out of the hosts and change a resource allocation to the storage apparatus;
acquire history information about a copy time of the remote copy processing: and
calculate an estimated copy wait time which is an estimated value of a copy wait time from the instruction to execute the remote copy processing of the object data to its start on the basis of the history information; judge whether the estimated copy wait time exceeds an upper limit of a specified threshold value or not; and, if the estimated copy wait time exceeds the upper limit of the specified threshold value, issue an instruction to change the quantity of hosts or change the resource allocation so that the estimated copy wait time will become equal to or less than the upper limit of the specified threshold value,
wherein if the host information indicates that a failure has occurred in the main environment cloud, the at least one processor is further configured to:
issue an instruction to activate the host and the storage apparatus in order to cause the system with highest priority to operate in the cloud as a target system to be resumed; and
if it is judged by the at least one processor that the estimated copy wait time is equal to or less than the upper limit of the specified threshold value, issue an instruction to the storage apparatus to start the remote copy processing of the object data.

2. The information processing apparatus according to claim 1,
wherein the access frequency information is a first number of accesses by the host to the storage apparatus with respect to each data ID for identifying data and a second number of accesses by the host to the storage apparatus with respect to each host and each data ID; and
wherein the at least one processor is further configured to calculate:
an access rate which is a ratio of the first number of accesses for each data ID to a total sum of the first number of accesses;
access locality which is a ratio of a total sum of the second number of accesses for each auto-scaling host, which is the host belonging to an auto-scale group of the target system to be resumed, and for each data ID to the total sum of second number of accesses for each data ID; and
access shareability which is a ratio of a total sum of the second number of accesses for each host of the target system to be resumed and for each data ID to the total sum of the second number of accesses for each auto-scaling host; and
judge that data with the data ID regarding which at least any one of the access rate, the access locality, and the access shareability exceeds their judgment threshold, is the object data.

3. The information processing apparatus according to claim 1,
wherein the at least one processor is further configured to:
calculate, on the basis of the history information, average data copy time which is average required time from the copy instruction of the remote copy processing to a completion of copying as performed during a certain amount of time, an average arrival rate which is a number of instructions of the remote copy processing per unit time as performed during the certain amount of time, and an average service rate which is a number of executions of the remote copy processing per unit time; and calculate the estimated copy wait time on the basis of the average data copy time, the average arrival rate, and the average service rate.

4. The information processing apparatus according to claim 1,
wherein the specified threshold value is a preset value to satisfy SLA (Service Level Agreement) of response performance of the target system to be resumed.

5. The information processing apparatus according to claim 1,
wherein changing the resource allocation of the storage apparatus includes any one of the following:
changing allocation of all ports for the remote copy which are allocated to the storage apparatus so that a utilization rate of the ports becomes equal to or smaller than a threshold value;
changing allocation of all cache memories for the remote copy which are allocated to the storage apparatus so that a utilization rate of the cache memories becomes equal to or smaller than a threshold value; and
increasing or decreasing a number of parallel processing for the remote copy processing.

6. The information processing apparatus according to claim 1,
wherein the quantity of hosts is changed to decrease the quantity of hosts for the system or systems with the priority lower than a constant value.

7. The information processing apparatus according to claim 6,
wherein the quantity of hosts is changed to decrease the quantity of hosts for the system regarding which a number of accesses to the main environment storage apparatus by the hosts is equal to or more than a constant value, among the systems with the priority lower than the constant value.

8. The information processing apparatus according to claim 1,
wherein after all the systems are resumed,
the at least one processor is further configured to:
judge whether the estimated copy wait time exceeds the upper limit of the specified threshold value or not;
if the estimated copy wait time exceeds the upper limit of the specified threshold value, issue an instruction to change the quantity of hosts or change the resource allocation so that the estimated copy wait time will become equal to or less than the upper limit of the specified threshold value; and
if the estimated copy wait time is less than a lower limit of the specified threshold value, issue an instruction to change the quantity of hosts or change the resource allocation so that the estimated copy wait time will become equal to or more than the lower limit of the specified threshold value.

9. The information processing apparatus according to claim 1,
wherein the at least one processor is further configured to insert data which is not the object data, which has not been copied without being subject to the remote copy processing, and which is accessed by the host or hosts, into a queue for the remote copy processing in order to execute the remote copy processing.

10. The information processing apparatus according to claim 1,
wherein the at least one processor is configured to execute the remote copy processing on data which is not the object data, which has not been copied without being subject to the remote copy processing, and which has not been accessed yet from the host or hosts since all the systems resumed, at specified synchronization timing.

11. An information processing method executed by an information processing apparatus in a hybrid cloud having a cloud provided with a host or hosts where a system or systems are in operation, and a storage apparatus which is provided at other than the cloud and from and to which the host reads and writes data, the information processing apparatus for executing remote copy processing of data from a main environment hybrid cloud to the hybrid cloud,
wherein the main environment hybrid cloud has a cloud provided with a main environment host where the system or systems are in operation, and a main environment storage apparatus which is provided at other than the cloud and from and to which the main environment host reads and writes data,
the information processing method comprising the steps of:
an access frequency information acquisition step of acquiring access frequency information regarding an access frequency from the host to each piece of data stored in the storage apparatus;
a copy data judgment step of judging object data of the remote copy processing on the basis of a priority of the system and the access frequency information;
a data copy execution step of issuing an instruction to the storage apparatus to start executing the remote copy processing of the object data;
a host information acquisition step of acquiring host information of the main environment host;
a configuration change instruction step of issuing an instruction to activate the host and the storage apparatus and also issuing an instruction to change a quantity of hosts to perform scale-in/scale-out of the hosts and change a resource allocation to the storage apparatus;
a copy processing information acquisition step of acquiring history information about copy time of the remote copy processing: and
an estimated copy wait time calculation step of: calculating an estimated copy wait time which is an estimated value of a copy wait time from the instruction to execute the remote copy processing of the object data to its start on the basis of the history information; judging whether the estimated copy wait time exceeds an upper limit of a specified threshold value or not; and, if the estimated copy wait time exceeds the upper limit of the specified threshold value, issuing an instruction to the configuration change instruction step to change the quantity of hosts or change the resource allocation so that the estimated copy wait time will become equal to or less than the upper limit of the specified threshold value,
wherein if the host information indicates that a failure has occurred in the main environment cloud, the information processing method further comprising the steps of:
in the configuration change instruction step, the information processing apparatus issuing an instruction to activate the host and the storage apparatus in order to cause the system with highest priority to operate in the cloud as a target system to be resumed; and if it is judged by the estimated copy wait time calculation step that the estimated copy wait time is equal to or less than the upper limit of the specified threshold value, in the data copy execution step, the information processing apparatus issuing an instruction to the storage apparatus to start the remote copy processing of the object data.

12. The information processing method according to claim 11,
wherein the access frequency information is a first number of accesses by the host to the storage apparatus with respect to each data ID for identifying data and a second number of accesses by the host to the storage apparatus with respect to each host and each data ID; and
wherein in the copy data judgment step, the information processing apparatus calculates:
an access rate which is a ratio of the first number of accesses for each data ID to a total sum of the first number of accesses;
access locality which is a ratio of a total sum of the second number of accesses for each auto-scaling host, which is the host belonging to an auto-scale group of the target system to be resumed, and for each data ID to the total sum of second number of accesses for each data ID; and
access shareability which is a ratio of a total sum of the second number of accesses for each host of the target system to be resumed and for each data ID to the total sum of the second number of accesses for each auto-scaling host; and
judges that data with the data ID regarding which at least any one of the access rate, the access locality, and the access shareability exceeds their judgment threshold, is the object data.

13. The information processing method according to claim 11,
wherein in the copy data judgment step, the information processing apparatus:
calculates, on the basis of the history information, average data copy time which is average required time from the copy instruction of the remote copy processing to a completion of copying as performed during a certain amount of time, an average arrival rate which is a number of instructions of the remote copy processing per unit time as performed during the certain amount of time, and an average service rate which is a number of executions of the remote copy processing per unit time; and
calculates the estimated copy wait time on the basis of the average data copy time, the average arrival rate, and the average service rate.

* * * * *